United States Patent [19]

Yuasa

[11] Patent Number: 4,636,815

[45] Date of Patent: Jan. 13, 1987

[54] ELECTROSTATIC RECORDING APPARATUS

[75] Inventor: Kazuhiro Yuasa, Zama, Japan

[73] Assignee: Ricoh Company Ltd., Japan

[21] Appl. No.: 658,198

[22] Filed: Oct. 5, 1984

[30] Foreign Application Priority Data

Oct. 5, 1983 [JP] Japan ................................ 58-185123

[51] Int. Cl.[4] ............................................ G01D 15/10

[52] U.S. Cl. ............................ 346/153.1; 346/76 PH

[58] Field of Search ........................ 346/153.1, 76 PH; 101/DIG. 13; 400/119, 120; 358/300; 355/16, 14 TR, 14 CH; 219/216 PH

[56] References Cited

U.S. PATENT DOCUMENTS 3,866,236 2/1975 Goffe ................................ 346/153.1

FOREIGN PATENT DOCUMENTS 876577 12/1957 United Kingdom ....... 101/DIG. 13

*Primary Examiner*—Arthur G. Evans
*Attorney, Agent, or Firm*—Guy W. Shoup

[57] ABSTRACT

An electrostatic recording apparatus includes an endless belt of dielectric material which is supported by a plurality of rollers to move along a predetermined path. A charger is provided to uniformly charge both sides of the belt in opposite polarities. A thermal printhead is provided at one side of the belt to apply a heat pattern in accordance with an image signal to have the charge selectively discharged on either side to define an electrostatic latent image. A developing unit is provided at the opposite side of the belt for developing the latent image by applying toner thereto. Such an arrangement in which the thermal printhead and the developing unit are provided opposite sides with respect to the belt is particularly advantageous.

8 Claims, 5 Drawing Figures

ELECTROSTATIC RECORDING APPARATUS

BACKGROUND OF THE INVENTION

1. Field of the Invention

This invention generally relates to a recording apparatus, such as a copier, printer and facsimile machine, and in particular to an electrostatic recording apparatus in which an electrostatic latent image is first formed and then the latent image is developed into a visible image.

2. Description of the Prior Art

As an apparatus for recording image information on a sheet of plain paper, an electrophotographic recording system employing a laser or a LED array as an optical write-in unit for writing image information on a photosensitive member is known. However, such a system is disadvantaged mainly in high cost. Also well known is a recording system using a multi-stylus head for writing image information on a dielectric belt. However, this system is also disadvantaged in high cost as well as in difficulty in maintenance of a proper gap between the multi-stylus head and the dielectric belt. In addition, this latter system also suffers from a disadvantage of deposition of developer to the multi-stylus head, which could also deteriorate the quality of resultant image. Therefore, there has been a need to develop an improved electrostatic recording apparatus simple in structure, easy in maintenance, excellent in imaging performance and low in cost.

SUMMARY OF THE INVENTION

It it therefore a primary object of the present invention to provide an improved electrostatic recording apparatus simple in structure and low in cost.

Another object of the present invention is to provide an improved electrostatic recording apparatus capable of providing recording images excellent in quality at all times and alleviating the burden of maintenance significantly.

A further object of the present invention is to provide an improved image-transfer type electrostatic recording apparatus using an endless recording belt on which is formed a developed image which is then transferred to a cut sheet of plain paper.

Other objects, advantages and novel features of the present invention will become apparent from the following detailed description of the invention when considered in conjunction with the accompanying drawings.

DESCRIPTION OF THE PREFERRED EMBODIMENTS

Figure 1:
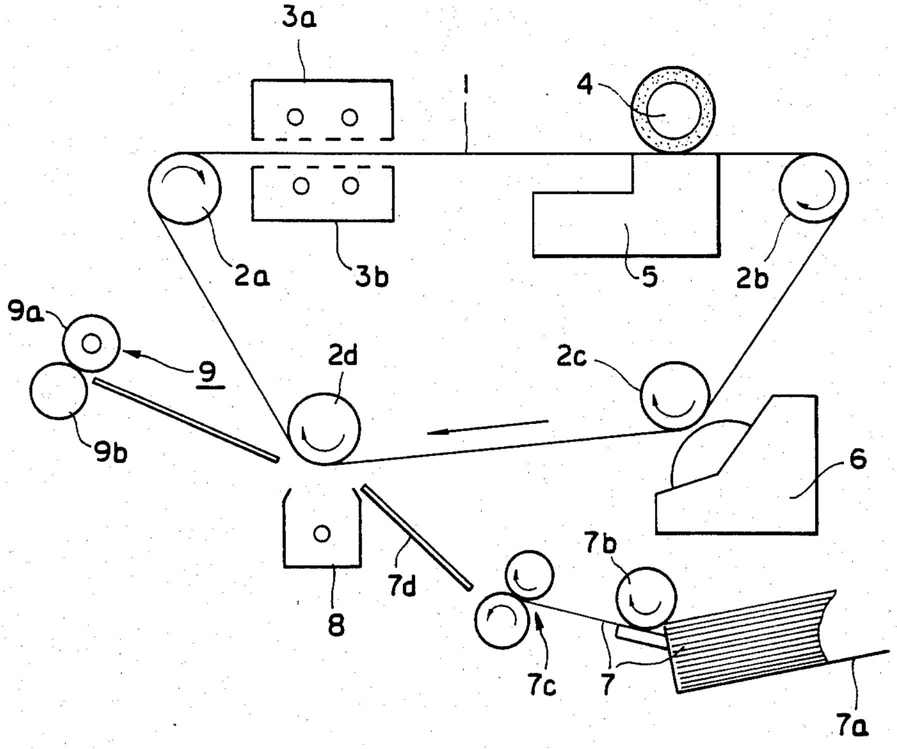
FIG. 1 is a schematic illustration showing the overall structure of an electrostatic recording apparatus constructed in accordance with one embodiment of the present invention.

Referring now to FIG. 1, there is schematically shown the overall structure of an electrostatic recording apparatus constructed in accordance with one embodiment of the present invention. As shown, the recording apparatus includes an endless recording belt 1 which is comprised of a single layer belt of dielectric material, such as polyester, in the illustrated embodiment. The recording belt 1 is extended around four support rollers 2*a* through 2*d*, which are rotatably journaled to a machine housing (not shown) of the apparatus. Although not shown specifically, it is so structured that at least one of the rollers 2*a* through 2*d* is spring-biased in a direction outward of the circumference defined by the endless recording belt 1 so that the belt 1 is always maintained in tension, as well known in the art. Moreover, one of the rollers 2*a* through 2*d* is coupled to a driving source, such as a motor, so that the recording belt 1 may be driven to advance at constant speed in the direction indicated by the arrow, clockwise in the illustrated example.

Figure 2:
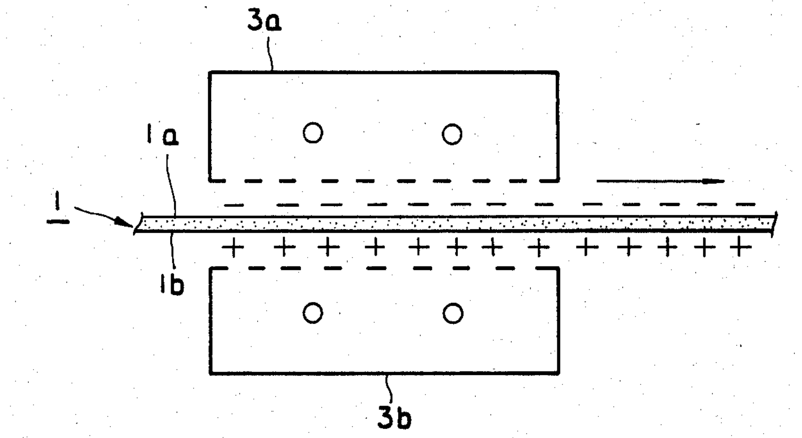
FIG. 2 is a schematic illustration showing a step of uniformly charging both sides of endless recording belt 1 with a duplex corona charger 3 shown in the structure of FIG. 1.

A duplex corona charger 3 comprising a pair of scorotron chargers 3*a* and 3*b* is disposed between the rollers 2*a* and 2*b* with each of the scorotron chargers 3*a* and 3*b* disposed at each side of the recording belt 1. It is to be noted that high voltages of opposite polarity are applied to the corona wires of respective scorotron chargers 3*a* and 3*b*. In the illustrated embodiment, a negative high voltage is applied to the corona wires of upper scorotron charger 3*a* and a positive high voltage is applied to the corona wires of lower scorotron charger 3*b*. This, as schematically shown in FIG. 2, as the recording belt 1 moves in the direction indicated by the arrow through a gap defined between the oppositely arranged scorotron chargers 3*a* and 3*b*, its outer surface 1*a* is uniformly charged to the negative polarity with its inner surface 1*b* uniformly charged to the positive polarity. It is to be noted that use may be made of any other charging means, such as corotron chargers, for charging both sides of the recording belt 1 uniformly to opposite polarities.

Figure 3:
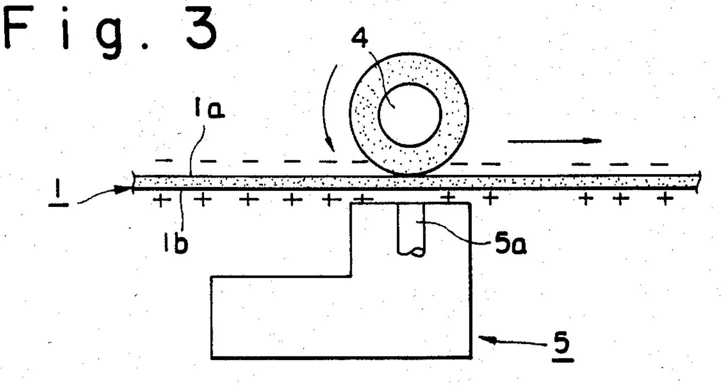
FIG. 3 is a schematic illustration showing a step of forming an electrostatic latent image on the belt 1 with a thermal printhead 5 shown in the structure of FIG. 1.

Downstream of the charger 3 with respect to the advancing direction of the recording belt 1 is disposed an image forming unit comprising a platen roller 4 and thermal printhead 5. The platen roller 4 is so disposed to be in rolling contact with the outer surface 1*a* of the recording belt 1 by pressing the belt 1 somewhat inwardly, thereby determining and maintaining the position of the belt 1 at a predetermined level while passing through this station. The thermal printhead 5 is disposed opposite to the platen roller 4 with a portion of the recording belt 1 sandwiched therebetween. The thermal printhead 5 itself is well known in the art and, although not shown specifically, it includes a plurality of heat-producing elements, which are typically comprised of an electrically resistive material and which are arranged in a single array at a predetermined pitch as extending in a transverse direction of the belt 1. As well known in the art, these heat-producing elements are electrically connected to a control circuit which causes the heat-producing elements selectively activated in accordance with an image signal supplied thereto from an external circuitry. Accordingly, as shown in FIG. 3, when a heat-producing element 5*a* is selectively activated, a heat spot is applied to the recording belt 1 which has been uniformly charged by the duplex corona charger 3 so that that portion of the charge on either side of the belt 1, i.e., outer and inner surfaces 1*a* and 1*b*, to which the heat spot is applied by the thermal printhead 5 is thermally removed. In this manner, the uniform charge on either side of the recording belt 1 is selectively removed due to application of heat spots from the thermal printhead 5 so that there is formed an electrostatic latent image on either side, i.e., 1*a* or 1*b*, of the recording belt 1 after passing through the image forming station. It is to be noted, however, that the heat spot applied to the recording belt 1 from the heat-producing element 5*a* of printhead 5 must be high enough to cause local dissipation of charge on either side of the belt 1. It should further be noted that since an electrostatic latent image is formed by selectively dissipating the uniform charge due to application of a heat pattern, a gap between the thermal printhead 5 and the recording belt 1 is not so critical, which allows to obtain an image of excellent quality at all times and to relax the requirements of maintenance.

Figure 4:
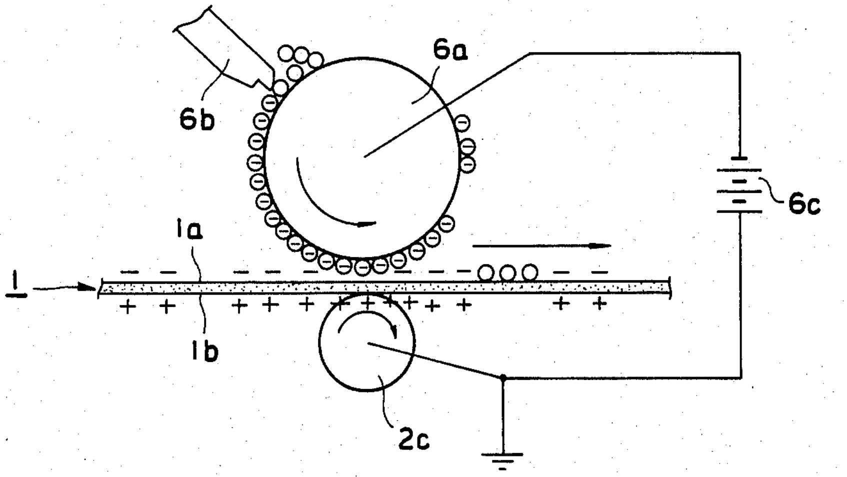
FIG. 4 is a schematic illustration showing a step of developing an electrostatic latent image formed on the belt 1 with a developing device 6 employing toner as a developer.

Further downstream of the image forming station with respect to the advancing direction of recording belt 1 is disposed a developing unit 6. As shown in FIG. 4, the developing unit 6 of illustrated embodiment includes a developing roller 6*a* which is driven to rotate in the direction indicated by the arrow, i.e., couterclockwise. A doctor blade 6*b* of predetermined material is provided in a cooperating relation with the developing roller 6*a* such that a quantity of toner supplied, for example, from a hopper (not shown) is formed into a film of toner which is uniform in thickness and charged to a predetermined polarity, or negative polarity in the illustrated embodiment. In the illustrated embodiment, since the toner is likely charged as the remaining charge on the outer surface 1*a* of belt 1 defining a charge pattern, the negatively charged toner on the developing roller 6*a* is selectively deposited onto those areas where no negative charge is present on the outer surface 1*a*. Thus, the so-called reversed development takes place in the present embodiment. As a result, there is formed a visible toner image due to selective deposition of toner to the outer surface 1*a* of the recording belt 1.

In the preferred embodiment, a negative bias voltage is applied to the developing roller 6*a* by connecting a negative terminal of a voltage supply 6*c* to the developing roller 6*a* while connecting the positive terminal of voltage supply 6*c* and the support roller 2*c* commonly connected to ground.

In the case where the electrostatic latent image formed on the outer surface 1*a* of recording belt 1 is of the positive type, then the toner applied by the developing unit 6 should be charged to the opposite or positive polarity. In this case, the so-called normal development takes place.

It is to be noted as clear from the above description that development is carried out at the outer surface 1*a* of belt 1 which is opposite to the inner surface 1*b* on which write-in operation is carried out by the thermal printhead 5 in the present structure. Thus, the printhead 5 is well prevented from receiving any toner and it may be kept clean at all times. Such a structure is particularly advantageous in terms of maintenance as well as of quality of resultant image. Moreover, this allows to provide an increased tolerance for a cleaning unit if it is to be provided in the downstream section for cleaning the outer surface 1*b* after transfer of developed image to a transfer medium. Alternatively, according to the present invention, the recording system may be constructed without provision of a cleaning unit as shown in FIG. 1, which adds another advantage in lowering cost and making the entire structure more compact in size.

Returning again to FIG. 1, the present recording apparatus also includes a paper holder 7*a* holding thereon a stack of cut sheets of plain paper 7. A feed roller 7*b* is provided at the supply end of the paper holder 7*a* and the feed roller 7*b* is intermittently driven to rotate clockwise to feed the cut sheets of plain paper 7 one by one from the top of the stack. The cut sheet of paper 7 as fed by the feed roller 7*b* reaches a registration roller 7*c* where the cut sheet of paper 7*b* is temporarily stopped. In association with the movement of the recording belt 1, the registration roller 7*c* is driven to rotate to cause the temporarily stopped cut sheet of paper 7 to start to move along a guide plate 7*d* which leads to an image transfer station where a transfer corona unit 8 is disposed opposite to the outer surface 1*b* on which a developed image is present.

Figure 5:
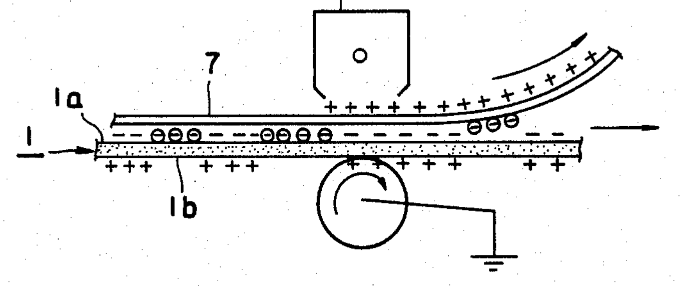
FIG. 5 is a schematic illustration showing a step of transferring the thus developed image to a sheet of plain paper with a corona transfer unit 8 shown in the structure of FIG. 1.

As best shown in FIG. 5, a front surface of the cut sheet of paper 7 from the guide plate 7*d* is brought into contact with the outer surface 1*a* of recording belt 1 in the image transfer station where the transfer corona unit 8 applies charge of positive polarity to the backside of the cut sheet of paper 7. Accordingly, the developed image formed by negatively charged toner on the outer surface 1*a* of recording belt 1 is electrostatically attracted to the cut sheet of paper 7. As a result, when the cut sheet of paper 7 is separated from the recording belt 1 by any well known means, such as a pawl, the developed image on the recording belt 1 is transferred to the cut sheet of paper 7. The support roller 2*d* disposed opposite to the transfer corona unit 8 is preferably connected to ground as shown in FIG. 5. Although a corona transfer technique is used in the above-described embodiment, use may be made of any other appropriate image transfer technique, such as a pressure transfer technique using a pressure roller.

As also shown in FIG. 1, an image fixing unit 9 is disposed in a transportation path for transporting the cut sheet of paper 7 separated from the recording belt 1 and thus bearing thereon the developed image as transferred from the recording belt 1. The image fixing unit 9 of illustrated embodiment includes a heat roller 9*a* and a pressure roller 9*b* which are rotatably supported and in rolling contact under pressure. Thus, as the cut sheet of paper 7 bearing thereon the toner image moves past the image fixing unit, the toner image on the cut sheet of paper 7 becomes fused and thus fixed thereto.

On the other hand, after image transfer, the recording belt 1 returns to the charging station where the duplex charger 3 is provided to initiate the next cycle of image forming operation. If desired, a cleaning unit of any conventional type may be provided between the image transfer and uniform charging stations for removing any toner remaining on the outer surface 1*a* of recording belt 1 after image transfer and prior to application of uniform charge.

While the above provides a full and complete disclosure of the preferred embodiments of the present invention, various modifications, alternate constructions and equivalents may be employed without departing from the true spirit and scope of the invention. For example, either one of the corona chargers 3*a* and 3*b* may be discarded, if desired. Furthermore, instead of making in the form of an endless belt, the image bearing member may be made in the form of a drum. Therefore, the above description and illustration should not be construed as limiting the scope of the invention, which is defined by the appended claims.

What is claimed is:

1. A recording apparatus comprising:

a recoding medium of dielectric material supported to advance along a predetermined path, said recording medium having a first surface and a second surface which is opposite of said first surface;

charging means for uniformly charging both sides of said recording medium opposite in polarity;

a thermal printhead disposed to oppose said first surface of said recording medium for applying a heat pattern defined by image information to said recording medium thereby causing at least the uniform charge on said second surface selectively discharged in accordance with the heat pattern thus applied to define an electrostatic latent image on said recording medium; and developing means for developing said latent image on said recording medium by applying a developer to said second surface of said recording medium thereby forming a developed image on said second surface of said recording medium.

2. Apparatus of claim 1 further comprising image transfer means for transferring said developed image formed on said second surface of said recording medium to a transfer medium which is temporarily brought into contact with said second surface of said recording medium.

3. Apparatus of claim 2 wherein said recording medium is formed in the form of an endless belt which is supported to advance along said predetermined path by means of a plurality of support rollers.

4. Apparatus of claim 3 wherein said endless recording belt is formed by a single layer of dielectric material.

5. Apparatus of claim 4 wherein said dielectric material is polyester.

6. Apparatus of claim 1 wherein said charging means includes a pair of corona chargers disposed on both sides of said recording medium, said corona chargers applying corona ions of opposite polarities to opposite sides of said recording medium thereby causing said recording medium to be uniformly charged to opposite polarities on both sides thereof.

7. Apparatus of claim 1 further comprising a platen roller disposed opposite to said printhead with a portion of said recording medium sandwiched therebetween.

8. Apparatus of claim 2 further comprising transporting means for transporting said transfer mediums one by one in association with the movement of said recording medium thereby allowing said transfer medium to be temporarily brought into contact with said recording medium in registry with said developed image formed on said recording medium to insure that the developed image may be transferred to the transfer medium properly.

* * * * *